Jan. 3, 1933.  A. J. LIBERMAN  1,893,092

DEVICE FOR CUTTING OUT SECTIONS OF A PHOTOGRAPHIC FILM FOR DEVELOPMENT

Filed March 7, 1932

INVENTOR

Patented Jan. 3, 1933

1,893,092

UNITED STATES PATENT OFFICE

ALEXANDER JEZEKIL LIBERMAN, OF BERLIN, GERMANY

DEVICE FOR CUTTING OUT SECTIONS OF A PHOTOGRAPHIC FILM FOR DEVELOPMENT

Application filed March 7, 1932, Serial No. 597,368, and in Germany April 13, 1931.

In employing roller-films commonly in use for photographic exposures, the great disadvantage appears, that the development of the separate exposures can only be made after exposing the whole film. This often gives occasion for quickly making a few unimportant and useless exposures, merely for the purpose of exposing the complete roll so that the development can be undertaken. In this way an unnecessary waste of the expensive film-material is also brought about.

By the invention, this disadvantage is obviated in such a way that it is possible to cut off any desired length out of a photographic film by daylight, in order to take out the exposed part, without cutting the paper-strip which serves as a layer for the film. According to the invention the unexposed film part can again be connected with the paper-strip in such a way that it is ready for further exposures in the camera in the usual manner.

Figure 1:
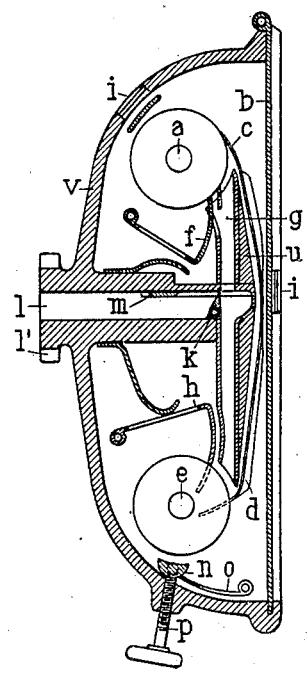
Figure 2:
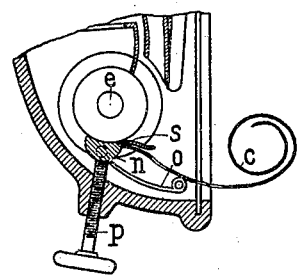
Figure 3:
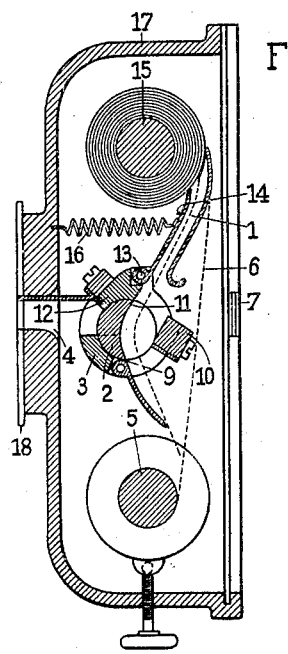
Figure 4:
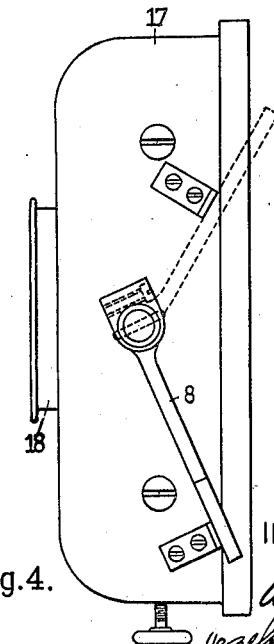

The invention will be readily understood from the following description thereof, reference being had to the accompanying drawings in which is:

Figure 1 a section through the device,

Figure 2 a partial view, similar to Figure 1, in which, however, the parts are shown in a different position, Figures 3 and 4 a modification of the device.

As is known, the films of the photographic filmrolls, commonly in use, are rolled on a paper-strip which serves, as a film protecting layer which is considerably longer than the film and therefore covers it at both ends by a considerable number of windings. By this means it is possible to insert the filmroll into the camera by daylight and to insert the end of the paper-strip into an empty roll (the rolling-up roll) without the possibility of exposing the film. The paper-strip is provided with a number of marks by which the exact position of the film can be recognized by means of openings fitted to the camera and mostly closed by red glass, past which the indicating marks move. The front end of the film is fixed to the paper-strip in such a way that the film is carried along with the paper-strip involuntarily. At the rear end, however, the film is free, i. e., not fixed to the paper-strip. As already mentioned, the film inserted into the camera had hitherto to remain in it, until all exposures had been made, if one did not wish to lose a part of the film or use it in a useless manner. At all events, it was not possible to separate a part of the film, in order to undertake further exposures later with the unexposed part.

The device according to the invention has for its object to obviate this disadvantage and permits of the exposed part of the film being cut off in daylight, in order to develop it and to make the unexposed part of the film again ready for exposure. For this purpose one proceeds as follows:

After a few exposures have been made, the film with the paper-strip is completely rolled up in the camera on the winding-up roll, just as if the whole film had been exposed. The wound-up roll is then taken out of the camera in the usual way which can be done by daylight and adjusted on the spindle $a$ of the device V, shown in the Figure 1. For this purpose the device is opened by raising the slide $b$ and the roll is inserted on the bearings as is customary in a camera. Thereupon a certain length of the paper-strip which serves as a layer for the film, is rolled off, is placed over the guide-surface $d$ and the end fixed to the roller $e$, in order to make the unrolling of the film possible. This unrolling is now carried out in the opposite direction as is done in the camera. After the roll has been inserted in to the device in the before described manner, the device is again closed, whereupon the roll is unwound from $a$ to $e$ by turning a handle located on the spindle of the roll $e$ outside of the device. One continues to turn until the end of the film begins to roll off from the roller $a$. This end which was the rear end when the roller unwound itself in the camera has now become the front end. The end of the film is now lying free and is bent in such a way that it does not follow the paper-strip, but makes an attempt to be wound up on the roller $a$. In order to avoid this a resilient guide-piece $f$ is provided which falls against the roller $a$ and can be pressed still firmer into the roller by a lever fixed outside of the device. The guide-piece *f* and the upper end of the channel *g* are provided with teeth which grip into each other comb-like. When the end of the film has reached the position shown here in Figure 1, the film runs onto the guide-piece *f* and is conducted into the channel *g*. As long as the paper-strip is further wound up by turning the roller *e*, the film also slides further into the channel *g*, is guided by a resilient guide-piece *h* to the roller *e* and is again rolled up with the paper-strip in the usual way.

By means of the red openings *i*, *i'* which have been provided for in the device, the movement of the film can be exactly followed and it can be recognized by the marks on the paper-strip, when the exposed part of the film comes to be unwound. When the corresponding mark appears below the opening *i* in the slide, the further unwinding of the film is interrupted and a guide-rail *k* is tilted towards the slide by means of a handle outside of the device, so that the film-strip is held fast in the channel *g*. In this way the guide-rail *k* opens the entrance to the side-channel *l* in which the cutter *m* is provided. The cutter consists for purposes of convenience of a scissors-like device. The fixed blade is formed by the upper wall of the side-channel 1 which has a slit corresponding with the channel *g* and whose longside edge is sharpened. The turnable blade of the cutter *m* is formed as a single arm lever which is led towards the upper wall of the side-channel *l*. The pivot-point of the cutter *m* is situated outside the film or paper-strip, but inside the device V. The movement of the cutter is carried out by hand by means of a lever fitted outside the device. As the wall *u* of the channel *g* lies between the filmband and the paper-guide-surface *d*, the paper-strip cannot be injured during the process of cutting the film in the channel *g*. When the film is cut off and the roller *e* is now turned further on, the exposed filmpart coming from the roller *e* enters into the side-channel *l* on acount of its great inclination to roll up at the cut-edge. The filmpart emerges from the left end of the side channel *l* so that it can be taken for further treatment. The unexposed filmpart still remaining in the channel-end *g* is taken up by the roller *e*.

During the further unwinding of the roller *a*, the point, where the film is stuck to the paper comes to lie on the beginning of the wall separating the channels *d* and *g*. By again setting the cutting device into action, the film is cut once more, without damaging the paper. By turning the roller *a* back, the small remaining filmend lying between the cut-edge and the adhesive-point is loosened.

The filmpart wound up on the roller *e* is unexposed and is to be made ready again for further exposures in the camera. In order that the film is taken along by the paper-strip in a camera, it must be again connected at one end with the paper. For this purpose one makes use of the clamping-device *n* which works in the following way:

After the roller *e* has completely wound up the slide *b* is opened. One then allows the end of the paper-strip *c* which is still on the roller *a* to come out, as shown in Figure 2, and carefully winds off the paper-strip which is wound up on roller *e* so far, until the end of the film appears. The clamping-device *n*, being held at the sides by guides *o*, is now lifted up by means of the screw *p* so that the film and paper layer is pressed tightly together on the bobbin, in order to avoid the exposure of the film on account of the penetrating daylight. The small filmend *s* (Figure 2) only comes out and can now be stuck to the paperstrip *c* in a similar way as at first, for instance, by a strip of gummed paper. The small filmend *s* has naturally been exposed, but in this case it is merely a matter of that part of the film which lies between two consecutive exposures so that, practically speaking, no useful part of the film is injured. Hereupon the clamping-device *n* is released and the paper-strip, together with the affixed end of the film, is completely wound upon the roller *e* which now can be used in the camera like a new film-roll.

By the modification according to Figures 3 and 4 the cutting-device for the film is changed. The operation of the modified device is the same as the operation of the device shown in Figure 1. The film also enters in a channel 1, but the cutter is a rotary cutter 2 which in its section has a shape like a crescent and which revolves in a circular cavity 9, having openings to the channels 1 and 4. In the position, shown in Figure 3, the circular shaped knife 2 with its inner curvature lies in the extension of the inner wall of the channel 1 and conducts the end of the film-strip to the roller 5 (the filmband is shown in Figure 3 in dotted lines). When the film-strip has taken up the desired position, viz, when the corresponding mark on the paper-strip 6 appears before the opening 7, the knife 2 is turned with the aid of a lever 8 (Figure 4) which is affixed to the spindle of the knife and situated on the outside of the apparatus. During this movement, the knife turns in its bearings counter-clockwise and its front edge strikes the fixed block 10 and cuts the film-strip at this point. The cutter has taken the position shown in dotted lines, the lever 8 is also tilted in the position shown in dotted lines in Figure 4. At this moment, the inner curvature of the cutter leads the film-strip in the direction of the opening of channel 4 by which it can leave the apparatus as illustrated in the first example.

When the filmband is completely unwound, it is sufficient, in order to cut off the end of the band, to replace the lever 8 into the position shown in full lines in Figure 4, whereby at the same time the cutter 2 is returned in its position shown in full lines in Figure 3. When the upper edge 11 of this cutter strikes the film-piece 12, the film is cut at this point and now one proceeds in the same manner as shown in the first example.

As is to be seen from the foregoing, the cutter 2 serves at the same time as knife and as switch (lid), in order to open and close the extension of the channel 1. The operation is therefore simpler than that of the first example, as a single movement of a single lever on the outside of the apparatus suffices, to cause two effects at the same time which had to be brought about in the first example by two lever-actions.

The example according to Figure 3 differs also from the foregoing one inasmuch as the channel 1 is pivoted on the joint 13 and that the wall 14 of the channel lies against the roller 15 so that the filmband which leaves the roller enters the channel 1. The wall 14 of channel 1 is continually pressed against roller 15 by means of a spring 16. It is possible under certain circumstances to do without this spring if the paper exercises a sufficient pressure on the outer side of channel 1, without pressing the wall 14 of channel 1 against roller 5. By this means an external lever is also done away with which presses the guide-piece *f* against the roller 5 in the first example.

The casing of the apparatus 17 has on the outerside of channel 4 a T-shaped extension 18 by means of which it can be attached to a light-proof casing in which the cut-off film-strips are collected for development or which serves to convey them into the darkroom or to another developing apparatus.

It is a matter of course that the invention does not confine itself to the above described constructions which are only cited as examples and that all desirable alterations or improvements can be undertaken by those skilled in the art.

What I claim is:

1. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a fixed channel-wall separating the ways and a cutter in the way of the film to cut the film; the cutter being prevented by the channel-wall from cutting the paper-strip.

2. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a resilient comb-like acting guide-piece at the entrance to the channel intended for the film, a fixed channel-wall separating the ways and a cutter in the way of the film to cut the film; the cutter being prevented by the channel-wall from cutting the paper-strip.

3. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a resilient comb-like acting guide-piece at the entrance to the channel intended for the film, means for setting firmer in operation the guide-piece by manual action, a fixed channel-wall separating the ways and a cutter in the way of the film to cut the film; the cutter being prevented by the channel-wall from cutting the paper-strip.

4. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a resilient comb-like acting guide-piece at the entrance to the channel intended for the film, a resilient guide-piece on the exit-end of the filmway, a fixed channel-wall separating the ways and a cutter in the way of the film to cut the film; the cutter being prevented by the channel-wall cutting the paper-strip.

5. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a resilient comb-like acting guide-piece at the entrance to the channel intended for the film, a resilient guide-piece on the exit-end of the filmway, a fixed channel-wall separating the ways, a guide-rail movable from without which in the one position permits the unobstructed movement of the filmband from roller to roller, but after its turning holds the film fast in the channel, at the same time freeing the entrance to a side-channel and a cutter in the way of the film to cut the film; the cutter being prevented by the channel-wall cutting the paper-strip.

6. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a resilient comb-like acting guide-piece at the entrance to the channel intended for the film, a resilient guide-piece on the exit-end of the filmway, a fixed channel-wall separating the ways, a guide-rail movable from without for freeing the entrance to a side-channel, a cutter, guided in the side-channel; the cutter being prevented by the channel-wall cutting the paper-strip.

7. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a resilient comb-like acting guide-piece at the entrance to the channel intended for the film, a resilient guide-piece on the exit-end of the filmway, a fixed channel-wall separating the ways, a guide-rail movable from without for freeing the entrance to a side-channel, a cutter guided in the side-channel, the cutter being prevented by the channel-wall cutting the paper-strip, a clamping-device by which the still unexposed film and the paper-strip is pressed against the receiving roller.

8. Device for cutting any desired length out of a photographic film by daylight before developing and without cutting the paper-strip which serves as a layer for the film, comprising a light-proof casing, two spindles, rollers arranged to turn on said spindles and fixed to the ends of a paper-strip carrying the film, ways on which the paper-strip and the film move between these two rollers, a pivotally adjusted channel for the film the upper end of which is pressed against the film-roller, a circular cutter means providing a circular cavity below the channel in which said cutter is rotatable, a bearing cavity with two openings for the leading channels for the filmband, the filmband being cut through by turning the cutter and at the same time one leading-channel being blocked and the other leading-channel being opened to guide away the cut-off filmband into the channel intended for it.

In testimony whereof I affix my signature.

ALEXANDER JEZEKIL LIBERMAN.